United States Patent
Silbermann et al.

(10) Patent No.: US 7,921,639 B2
(45) Date of Patent: Apr. 12, 2011

(54) INTERNAL COMBUSTION ENGINE HAVING A LOW-PRESSURE EXHAUST-GAS RECIRCULATION

(75) Inventors: Kerstin Silbermann, Königslutter (DE); Wilfried Rhode, Meine (DE); Janet Schlothauer, Kunrau (DE); Arnd Schmidt, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 11/893,528

(22) Filed: Aug. 16, 2007

(65) Prior Publication Data
US 2008/0041051 A1 Feb. 21, 2008

(30) Foreign Application Priority Data
Aug. 18, 2006 (DE) .................. 10 2006 038 706

(51) Int. Cl.
*F02M 25/06* (2006.01)
(52) U.S. Cl. ................. 60/278; 60/280; 60/297; 60/311
(58) Field of Classification Search .............. 60/278, 60/280, 285, 297, 311
See application file for complete search history.

(56) References Cited

U.S. PATENT DOCUMENTS

| 4,356,806 | A | * | 11/1982 | Freesh | 123/568.12 |
| 5,205,265 | A | * | 4/1993 | Kashiyama et al. | 60/605.2 |
| 5,806,308 | A | * | 9/1998 | Khair et al. | 60/605.2 |
| 5,927,075 | A | * | 7/1999 | Khair | 60/605.2 |
| 6,138,649 | A | | 10/2000 | Khair et al. | |
| 6,742,335 | B2 | * | 6/2004 | Beck et al. | 60/605.2 |
| 6,932,063 | B1 | * | 8/2005 | Hu | 123/568.14 |
| 6,981,370 | B2 | * | 1/2006 | Opris et al. | 60/311 |
| 7,013,879 | B2 | | 3/2006 | Brookshire et al. | |
| 7,159,393 | B2 | * | 1/2007 | Blomquist et al. | 60/302 |
| 2005/0103013 | A1 | * | 5/2005 | Brookshire et al. | 60/605.2 |
| 2006/0021335 | A1 | | 2/2006 | Opris | |

FOREIGN PATENT DOCUMENTS

| DE | 69815543 T2 | 1/2004 |
| EP | 1094879 B1 | 4/2003 |
| EP | 1589213 A1 | 10/2005 |
| WO | 2004/007925 A1 | 1/2004 |

* cited by examiner

*Primary Examiner* — Thomas E Denion
*Assistant Examiner* — Diem Tran
(74) *Attorney, Agent, or Firm* — Manfred Beck, P.A.

(57) ABSTRACT

An internal combustion engine includes an exhaust-gas tract and a supply system for combustion air. A compressor of an exhaust-gas turbocharger is disposed in the supply system for combustion air. A turbine of the exhaust-gas turbocharger, a first particulate filter, and an adjustable exhaust-gas throttle are disposed in series in a downstream direction in the exhaust-gas tract. A low-pressure exhaust-gas recirculation line branches off from the exhaust-gas tract downstream of the first particulate filter and discharges into the supply system for combustion air upstream of the compressor. An exhaust-gas recirculation cooler, an exhaust-gas recirculation valve, and a second particulate filter with a filter mesh size of at least 50 μm are disposed in the low-pressure exhaust-gas recirculation line.

12 Claims, 1 Drawing Sheet

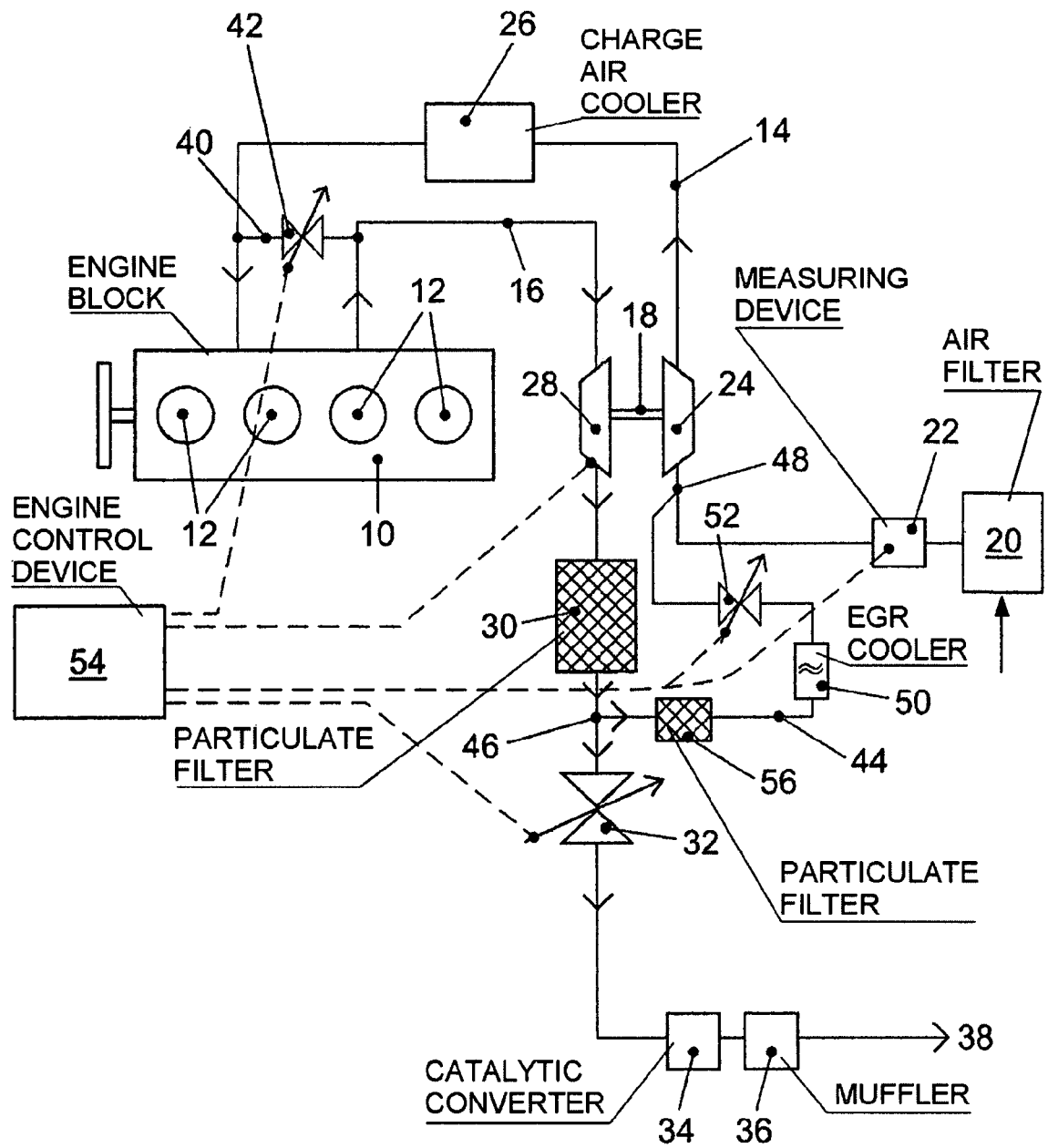

INTERNAL COMBUSTION ENGINE HAVING A LOW-PRESSURE EXHAUST-GAS RECIRCULATION

CROSS-REFERENCE TO RELATED APPLICATION

This application claims the priority, under 35 U.S.C. §119, of German application DE 10 2006 038 706.6, filed Aug. 18, 2006; the prior application is herewith incorporated by reference in its entirety.

BACKGROUND OF THE INVENTION

Field of the Invention

The invention relates to an internal combustion engine with an exhaust-gas tract, a supply system for supplying combustion air and an exhaust-gas turbocharger, which has a turbine disposed in the exhaust-gas tract and which has a compressor disposed in the supply system for combustion air, wherein the turbine, a particulate filter and an adjustable exhaust-gas throttle are disposed, in downstream direction, in series in the exhaust-gas tract, wherein a low-pressure exhaust-gas recirculation line is provided, which branches off from the exhaust-gas tract downstream of the first particulate filter and discharges into the supply system for combustion air upstream of the compressor, and wherein an exhaust-gas recirculation cooler and an exhaust-gas recirculation valve are disposed in the low-pressure exhaust-gas recirculation line.

An internal combustion engine of this type is disclosed in the German patent document DE 698 15 543 T2 and in corresponding U.S. Pat. No. 6,138,649. There, a low-pressure loop exhaust-gas recirculation (EGR) system is provided, which branches off downstream of the diesel particulate filter in the exhaust-gas tract and which includes an EGR-cooler and discharges into the intake line of a combustion air supply upstream of a compressor of the exhaust-gas turbocharger.

U.S. Pat. No. 7,013,879 B2 discloses an EGR system, which branches off upstream of the diesel particulate filter and therefore a further diesel particulate filter must be provided in the EGR line so that the exhaust-gas does not flow entirely unfiltered through the exhaust-gas tract. Such diesel particulate filters must however be designed for filtering out very small soot particles with diameters from 50 nm to 300 nm. Such diesel particulate filters accordingly constitute a flow resistance and it is therefore not possible to dispose two of these particulate filters in series.

SUMMARY OF THE INVENTION

It is accordingly an object of the invention to provide an internal combustion engine which overcomes the above-mentioned disadvantages of the heretofore-known internal combustion engines of this general type and which has an improved operational reliability.

With the foregoing and other objects in view there is provided, in accordance with the invention, an internal combustion engine, including:
an exhaust-gas tract;
a supply system for combustion air;
an exhaust-gas turbocharger including a turbine and a compressor, the turbine being disposed in the exhaust-gas tract, the compressor being disposed in the supply system for combustion air;
a first particulate filter disposed in the exhaust-gas tract;
an adjustable exhaust-gas throttle disposed in the exhaust-gas tract;
the turbine, the first particulate filter, and the adjustable exhaust-gas throttle being disposed in series in a downstream direction in the exhaust-gas tract;
a low-pressure exhaust-gas recirculation line branching off from the exhaust-gas tract downstream of the first particulate filter and discharging into the supply system for combustion air upstream of the compressor;
an exhaust-gas recirculation cooler disposed in the low-pressure exhaust-gas recirculation line;
an exhaust-gas recirculation valve disposed in the low-pressure exhaust-gas recirculation line; and
a second particulate filter disposed in the low-pressure exhaust-gas recirculation line, the second particulate filter having a filter mesh size of at least 50 μm such that the second particulate filter allows particles with a diameter of less than the filter mesh size to pass and holds back particles with a diameter of at least the filter mesh size.

In other words, in accordance with the invention, there is provided an internal combustion engine, in particular a diesel engine, in particular of a motor vehicle, with an exhaust-gas tract, a supply system for combustion air and an exhaust-gas turbocharger, which has a turbine disposed in the exhaust-gas tract and which has a compressor disposed in the supply system for combustion air, wherein the turbine, a first particulate filter and an adjustable exhaust-gas throttle are disposed, in downstream direction, in series in the exhaust-gas tract, wherein a low-pressure exhaust-gas recirculation line (LP-EGR line) is provided, which has a branch-off from the exhaust-gas tract downstream of the first particulate filter and has a junction into the supply system for combustion air upstream of the compressor, wherein an exhaust-gas recirculation cooler (EGR cooler) and an exhaust-gas recirculation valve are disposed in the low-pressure exhaust-gas recirculation line, and wherein additionally a second particulate filter is disposed in the low-pressure exhaust-gas recirculation line, wherein the second particulate filter has a filter mesh size of greater than or equal to 50 μm such that the second particulate filter allows particles with a diameter of less than the filter mesh size to pass and holds back particles with a diameter of greater than or equal to the filter mesh size.

This has the advantage that, one the one hand, the compressor of the exhaust-gas turbocharger is sufficiently protected from damage caused by impinging particles, which detach for example from the first particulate filter. On the other hand, it is ensured that the second particulate filter does not get clogged up and need not be replaced over the lifetime of the internal combustion engine and, respectively, the lifetime of the first particulate filter and that the second particulate filter always ensures a sufficient throughput and, respectively, a smallest possible pressure drop or pressure loss in the low-pressure exhaust-gas recirculation line (LP-EGR line). By implementing a defined filtering, undesired particles or debris particles that are larger than a given size that is damaging for the exhaust-gas turbocharger are held back over the lifetime of the internal combustion engine without noticeably impeding the flow of the low-pressure exhaust-gas recirculation.

In accordance with another feature of the invention, the filter mesh size of the second particulate filter, i.e. the mesh width of the filter, is substantially 300 μm, substantially 200 μm or substantially 100 μm such that the second particulate filter allows particles with a diameter of less than 300 μm, 200 μm and, respectively, 100 μm to pass and holds back particles with a diameter of at least 300 μm, 200 μm and, respectively, 100 μm.

In accordance with yet another feature of the invention, the second particulate filter includes a filter material including a wire mesh, a screen, a metal fleece or a sintered material.

In accordance with another feature of the invention, the low-pressure exhaust-gas recirculation line branches off from the exhaust-gas tract upstream of the adjustable exhaust-gas throttle. In other words, the branch-off (branch-off point) of the low-pressure exhaust-gas recirculation line (LP-EGR line) from the exhaust-gas tract is provided upstream of the adjustable exhaust-gas throttle.

In accordance with yet another feature of the invention, a measuring device for detecting a supplied air-mass is provided; the measuring device is disposed in the supply system for combustion air; and the low-pressure exhaust-gas recirculation line discharges into the supply system for combustion air downstream of the measuring device. In other words, the (inlet) junction of the low-pressure exhaust-gas recirculation line (LP-EGR line) into the supply system for combustion air is provided downstream of a measuring device for detecting a supplied air-mass that is disposed in the supply system for combustion air.

With the objects of the invention in view there is also provided, an engine configuration, including an internal combustion engine configured as a diesel engine, the diesel engine including an exhaust-gas tract; a supply system for combustion air; an exhaust-gas turbocharger including a turbine and a compressor, the turbine being disposed in the exhaust-gas tract, the compressor being disposed in the supply system for combustion air; a first particulate filter disposed in the exhaust-gas tract; an adjustable exhaust-gas throttle disposed in the exhaust-gas tract; the turbine, the first particulate filter, and the adjustable exhaust-gas throttle being disposed in series in a downstream direction in the exhaust-gas tract; a low-pressure exhaust-gas recirculation line branching off from the exhaust-gas tract downstream of the first particulate filter and discharging into the supply system for combustion air upstream of the compressor; an exhaust-gas recirculation cooler disposed in the low-pressure exhaust-gas recirculation line; an exhaust-gas recirculation valve disposed in the low-pressure exhaust-gas recirculation line; and a second particulate filter disposed in the low-pressure exhaust-gas recirculation line, the second particulate filter having a filter mesh size of at least 50 µm such that the second particulate filter allows particles with a diameter of less than the filter mesh size to pass and holds back particles with a diameter of at least the filter mesh size.

In accordance with yet another feature of the invention, the internal combustion engine is a motor vehicle engine.

Other features which are considered as characteristic for the invention are set forth in the appended claims.

Although the invention is illustrated and described herein as embodied in an internal combustion engine having a low-pressure exhaust-gas recirculation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic block diagram of a preferred embodiment of an internal combustion engine in accordance with the invention.

DESCRIPTION OF THE PREFERRED EMBODIMENTS

Referring now to the single FIGURE in detail, there is shown a preferred embodiment of an internal combustion engine according to the invention which includes an engine block 10 with working cylinders 12, a supply system 14 for combustion air, an exhaust-gas tract 16, and an exhaust-gas turbocharger 18. An air filter 20, a measuring device 22 for detecting the supplied air-mass (hot-film air-mass meter, HFM), a compressor 24 of the exhaust-gas turbocharger 18 and a charge air cooler 26 are provided in the supply system 14 for combustion air. A turbine 28 of the exhaust-gas turbocharger 18, a first particulate filter 30 embodied as a diesel particulate filter, an adjustable exhaust-gas throttle 32, an exhaust-gas aftertreatment system with at least a catalytic converter 34, in particular an $NO_x$ catalytic converter, a muffler 36 and an exhaust-gas outlet 38 are provided in the exhaust-gas tract 16.

A conventional high-pressure exhaust-gas recirculation line 40 (HP-EGR line) connects the supply system 14 for combustion air to the exhaust-gas tract 16 close to the engine block 10. The high-pressure exhaust-gas recirculation line (HP-EGR line) 40 connects the exhaust-gas tract 16 upstream of the turbine 28 to the supply system 14 for combustion air downstream of the compressor 24, in other words on both sides at points with high pressure. A high-pressure exhaust-gas recirculation valve (HP-EGR valve) 42 is disposed in the high-pressure exhaust-gas recirculation line (HP-EGR line).

Furthermore, a low-pressure exhaust-gas recirculation line 44 (LP-EGR line) is provided, which has a branch-off 46 from the exhaust-gas tract 16 downstream of the first particulate filter 30 and an inlet or junction 48 into the supply system 14 for combustion air upstream of the compressor 24 of the exhaust-gas turbocharger 18. A low-pressure exhaust-gas recirculation cooler (LP-EGR cooler) 50 and a low-pressure exhaust-gas recirculation valve (LP-EGR valve) 52 are provided in the low-pressure exhaust-gas recirculation line 44.

An engine control device 54 receives data from the hot-film air-mass meter 22 (HFM) and controls the high-pressure exhaust-gas recirculation valve (HP-EGR valve), the turbine 28 of the exhaust-gas turbocharger 18 for changing a turbine geometry, the low-pressure exhaust-gas recirculation valve 52 and the exhaust-gas throttle 32.

In accordance with an embodiment of the invention, a second particulate filter 56 is disposed in the low-pressure exhaust-gas recirculation line 44 (LP-EGR line), wherein the second particulate filter 56 has a filter mesh size of greater than or equal to 50 µm, in particular greater than or equal to 100 µm, 200 µm or 300 µm; so that the second particulate filter 56 allows particles with a diameter of less than the filter mesh size to pass and holds back particles with a diameter of greater than or equal to the filter mesh size.

The low-pressure exhaust-gas recirculation line 44 (LP-EGR line) serves to minimize the $NO_x$ raw emission (untreated emission) of the internal combustion engine. In this case, exhaust-gas is extracted after the diesel particulate filter 30, i.e. downstream of the diesel particulate filter 30 (DPF), through the use of a controllable baffle plate 32 (exhaust-gas throttle) and is supplied, via the low-pressure exhaust-gas recirculation cooler 50, through the use of a control valve (LP-EGR valve 52), via a discharge fitting (feed pipe) at the junction 48, upstream of the compressor 24 of the exhaust-gas turbocharger 18, to the fresh air i.e. to the supply system 14 for combustion air. The air/exhaust-gas mixture is compressed in the compressor 24 of the exhaust-gas turbocharger 18 and is then supplied, via the usual intake system and the charge air cooler 26, to the engine 10 for combustion.

During the operation, small particles detach from the diesel particulate filter 30. These particles partly result from the manufacturing process (weld spatter, dirt) and partly detach from the monolith. The observed particle size is between 20 μm to 2,000 μm. A portion of these particles or small parts travels, via the low-pressure exhaust-gas recirculation line 44 (LP-EGR line 44), all the way to the compressor wheel of the exhaust-gas turbocharger 18, strikes the compressor wheel, which rotates at a speed of up to 200,000 rotations per minute and, from a given particle size on, causes damage at the compressor wheel (impact marks, cracks, material becoming detached). This may cause damage and even a total failure of the exhaust-gas turbocharger.

In order to avoid this effect, the filter/separator in the form of the second particulate filter 56 is provided in accordance with the invention, wherein the second particulate filter 56 is disposed in the low-pressure exhaust-gas recirculation line 44 (LP-EGR line 44) and holds back 100% of the particles larger than a given size to be defined. In this manner a damage of the exhaust-gas turbocharger 18 is effectively avoided. The filter/separator may for example be a wire mesh which must have a given area in order to facilitate a pressure drop that is as small as possible. Metal fleeces or sintered materials may also be used. The filter material such as a wire mesh, a screen, a metal fleece and a sintered material is schematically illustrated as a cross-hatching of the second particulate filter 56.

Furthermore, the filter/separator 56 is maintenance-free, which means that the filters/separator 56 must only be exchanged in case of damage (e.g. breakthrough or replacement of the diesel particulate filter), but not in the context of maintenance intervals. This ensures an effective protection of the exhaust-gas turbocharger 18 together with the engine and an effective protection against "fouling" of the entire low-pressure exhaust-gas recirculation system 44 in case of a defect of the diesel particulate filter.

The retention (=filter mesh size) of the second particulate filter 56 is 50 μm to 300 μm, and preferably 100 μm to 200 μm. All particles that are smaller than 50 μm are certain to pass through such that a clogging of the filter is avoided. This protects the exhaust-gas turbocharger 18 and the entire engine in case of a diesel particulate filter defect.

The second particulate filter 56 is for example configured in the following manner: The throughput of the exhaust-gas quantity through the filter may be up to 100 kg/h or generally about 20% to 30% of the engine full-load throughput, temperatures in the second particulate filter 56 may be up to 800° C. The mass that is expected to be separated off or deposited over the lifetime of the second particulate filter 56 (without diesel particulate filter defect) may be about 100 mg to 250 mg. The maximum operating pressure may be 2.0 bar (abs.). The differential pressure at the second particulate filter 56 may be less than 50 mbar at 80 kg/h and 450° C.

What is claimed is:

1. An internal combustion engine, comprising:
    an exhaust-gas tract;
    a supply system for combustion air;
    an exhaust-gas turbocharger including a turbine and a compressor, said turbine being disposed in said exhaust-gas tract, said compressor being disposed in said supply system for combustion air;
    a first particulate filter disposed in said exhaust-gas tract;
    an adjustable exhaust-gas throttle disposed in said exhaust-gas tract;
    said turbine, said first particulate filter, and said adjustable exhaust-gas throttle being disposed in series in a downstream direction in said exhaust-gas tract;
    a low-pressure exhaust-gas recirculation line branching off from said exhaust-gas tract downstream of said first particulate filter and discharging into said supply system for combustion air upstream of said compressor;
    an exhaust-gas recirculation cooler disposed in said low-pressure exhaust-gas recirculation line;
    an exhaust-gas recirculation valve disposed in said low-pressure exhaust-gas recirculation line; and
    a second particulate filter disposed in said low-pressure exhaust-gas recirculation line, said second particulate filter having a filter mesh size of at least 50 μm such that said second particulate filter allows particles with a diameter of less than the filter mesh size to pass and holds back particles with a diameter of at least the filter mesh size, wherein said internal combustion engine is configured such that a temperature in said second particulate filter does not exceed 800° C.

2. The internal combustion engine according to claim 1, wherein said filter mesh size of said second particulate filter is substantially 300 μm such that said second particulate filter allows particles with a diameter of less than 300 μm to pass and holds back particles with a diameter of at least 300 μm.

3. The internal combustion engine according to claim 1, wherein said filter mesh size of said second particulate filter is substantially 200 μm such that said second particulate filter allows particles with a diameter of less than 200 μm to pass and holds back particles with a diameter of at least 200 μm.

4. The internal combustion engine according to claim 1, wherein said filter mesh size of said second particulate filter is substantially 100 μm such that said second particulate filter allows particles with a diameter of less than 100 μm to pass and holds back particles with a diameter of at least 100 μm.

5. The internal combustion engine according to claim 1, wherein said second particulate filter includes a filter material selected from the group consisting of a wire mesh, a screen, a metal fleece, and a sintered material.

6. The internal combustion engine according to claim 1, wherein said low-pressure exhaust-gas recirculation line branches off from said exhaust-gas tract upstream of said adjustable exhaust-gas throttle.

7. The internal combustion engine according to claim 1, including:
    a measuring device for detecting a supplied air-mass, said measuring device being disposed in said supply system for combustion air; and
    said low-pressure exhaust-gas recirculation line discharging into said supply system for combustion air downstream of said measuring device.

8. The internal combustion engine according to claim 1, wherein said second particulate filter is configured such that a differential pressure across said second particulate filter is less than 50 mbar at an exhaust-gas quantity of 80 kg/h through said second particulate filter.

9. The internal combustion engine according to claim 1, wherein said filter mesh size of said second particulate filter is between 100 μm and 200 μm.

10. An engine configuration, comprising:
    an internal combustion engine configured as a diesel engine, said diesel engine including:
    an exhaust-gas tract;
    a supply system for combustion air;

an exhaust-gas turbocharger including a turbine and a compressor, said turbine being disposed in said exhaust-gas tract, said compressor being disposed in said supply system for combustion air;

a first particulate filter disposed in said exhaust-gas tract;

an adjustable exhaust-gas throttle disposed in said exhaust-gas tract;

said turbine, said first particulate filter, and said adjustable exhaust-gas throttle being disposed in series in a downstream direction in said exhaust-gas tract;

a low-pressure exhaust-gas recirculation line branching off from said exhaust-gas tract downstream of said first particulate filter and discharging into said supply system for combustion air upstream of said compressor;

an exhaust-gas recirculation cooler disposed in said low-pressure exhaust-gas recirculation line;

an exhaust-gas recirculation valve disposed in said low-pressure exhaust-gas recirculation line; and a second particulate filter disposed in said low-pressure exhaust-gas recirculation line, said second particulate filter having a filter mesh size of at least 50 µm such that said second particulate filter allows particles with a diameter of less than the filter mesh size to pass and holds back particles with a diameter of at least the filter mesh size, wherein said internal combustion engine is configured such that a temperature in said second particulate filter does not exceed 800° C.

11. The engine configuration according to claim 10, wherein said internal combustion engine is a motor vehicle engine.

12. An internal combustion engine, comprising:

an exhaust-gas tract;

a supply system for combustion air;

an exhaust-gas turbocharger including a turbine and a compressor, said turbine being disposed in said exhaust-gas tract, said compressor being disposed in said supply system for combustion air;

a first particulate filter disposed in said exhaust-gas tract;

an adjustable exhaust-gas throttle disposed in said exhaust-gas tract;

said turbine, said first particulate filter, and said adjustable exhaust-gas throttle being disposed in series in a downstream direction in said exhaust-gas tract;

a low-pressure exhaust-gas recirculation line branching off from said exhaust-gas tract downstream of said first particulate filter and discharging into said supply system for combustion air upstream of said compressor;

an exhaust-gas recirculation cooler disposed in said low-pressure exhaust-gas recirculation line;

an exhaust-gas recirculation valve disposed in said low-pressure exhaust-gas recirculation line; and a second particulate filter disposed in said low-pressure exhaust-gas recirculation line, said second particulate filter having a filter mesh size of at least 50 µm such that said second particulate filter allows particles with a diameter of less than the filter mesh size to pass and holds back particles with a diameter of at least the filter mesh size, wherein said second particulate filter is configured such that a differential pressure across said second particulate filter is less than 50 mbar at an exhaust-gas quantity of 80 kg/h through said second particulate filter.

* * * * *